UNITED STATES PATENT OFFICE.

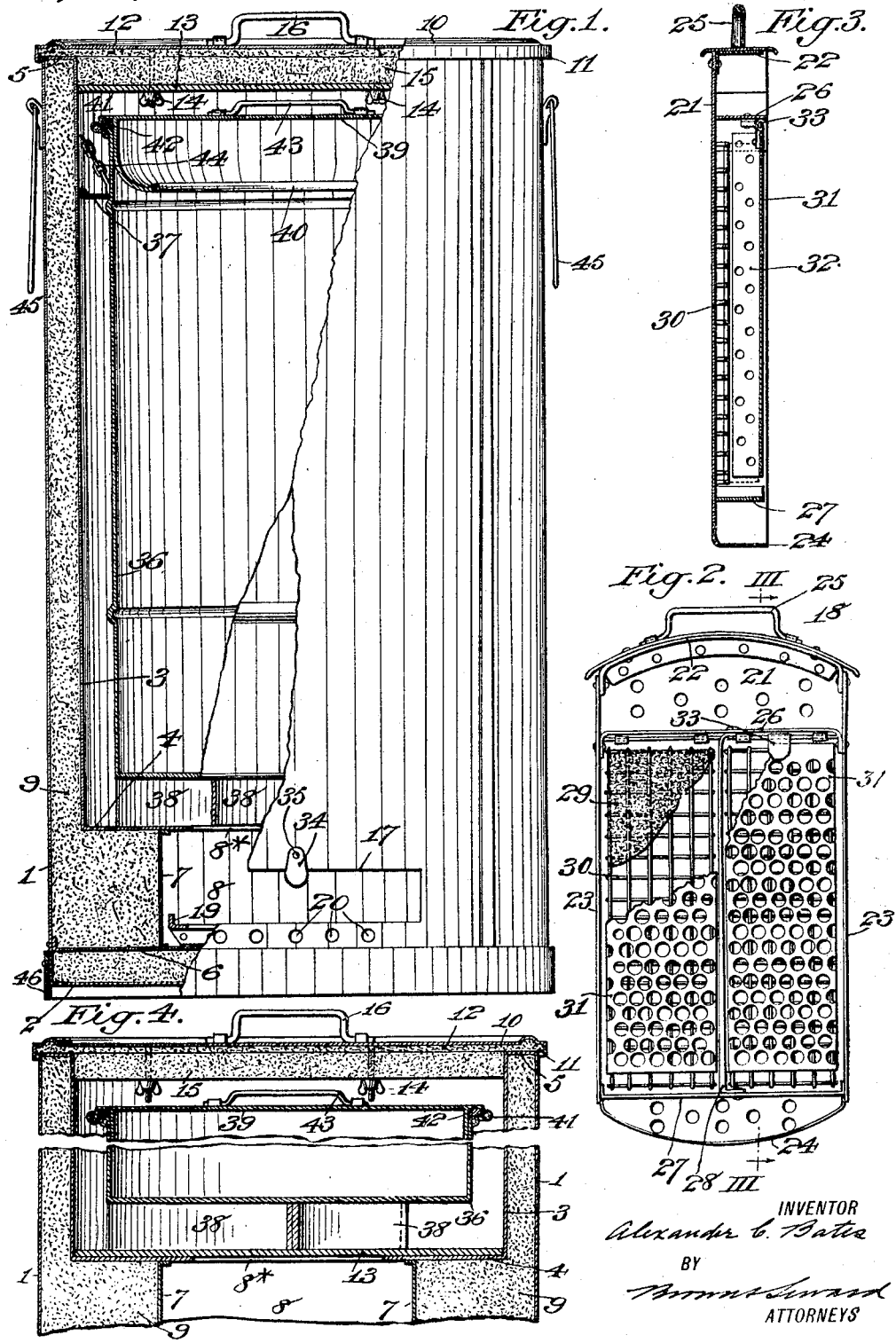

ALEXANDER C. BATES, OF NEW YORK, N. Y., ASSIGNOR TO TAPLEX CORPORATION, OF NEW YORK, N. Y., A CORPORATION OF NEW YORK.

STORAGE-RECEPTACLE.

1,324,025.  Specification of Letters Patent.  Patented Dec. 9, 1919.

Application filed November 7, 1918. Serial No. 261,535.

*To all whom it may concern:*

Be it known that I, ALEXANDER C. BATES, a citizen of the United States, and resident of the borough of Queens, in the city and State of New York, have invented a new and useful Improvement in Storage-Receptacles, of which the following is a specification.

This invention relates to storage receptacles with the object in view of providing a convenient and durable receptacle in which commodities may be stored, transported or cooked and kept at a desired temperature for a considerable period.

A further object is to provide a receptacle of this character, which is relatively cheap and simple in construction and efficient in operation.

A still further object is to provide certain improvements in the form, construction and arrangement of the several parts whereby the above named and other objects may be effectively carried out.

A practical embodiment of the invention is represented in the accompanying drawings, in which, Figure 1 represents a side elevation of the receptacle, partly in section with the fuel tray removed.

Fig. 2 represents a plan view of the fuel tray.

Fig. 3 represents a vertical longitudinal section taken in the plane of the line III—III of Fig. 2 looking in the direction of the arrows, and Fig. 4 represents a longitudinal central section of a portion of the upper and lower ends of the receptacle, showing another arrangement of the parts.

The body of the receptacle is formed of an outer wall 1 to which a bottom 2 is permanently secured or formed integral therewith, and an inner wall 3 to which a bottom 4 is permanently secured or formed integral therewith. The inner wall 3 is held permanently spaced from the outer wall 1 by a spacing rim 5 between the two walls. An intermediate bottom 6 is interposed between the bottoms 2 and 4 and arranged to receive vertical walls 7 which extend diametrically across the receptacle to form a fuel chamber 8. The walls 7 are secured in position to the bottoms 4 and 6 and serve to support the inner wall 3 and its bottom 4. The space between the walls 1 and 3 and the bottoms 2, 4 and 6 is filled with a suitable insulating material 9, such as ground cork, asbestos, etc. The bottom 4 is cut away at 8* between the walls 7, to open communication with the interior of the receptacle and the fuel chamber 8. The receptacle is provided with a cover 10 which has a depending rim 11 in which is located a gasket 12 of asbestos or other suitable material. A plate 13 fits within the wall 3 and is removably secured to the cover 10 by means of thumb screws 14. A filler piece 15 of insulating material is interposed between the plate 13 and the gasket 12 to assist in forming a tight closure for the receptacle. The cover 10 is also provided with a handle 16 by which the cover may be conveniently manipulated.

The wall 1 of the receptacle is cut away at 17 to receive a fuel tray 18 which is supported on L shaped guides 19 in the fuel chamber 8. The wall 1 is also provided with a series of holes 20 between the guides 19 to allow a circulation of air to pass into the fuel chamber.

The fuel tray comprises a perforated bottom 21 having a front wall 22, side walls 23 and an end wall 24. The front wall 22 is provided with a handle 25 for moving the tray. Intermediate walls 26 and 27 are secured to the side walls 23 and spaced a short distance from the front and end walls 22 and 24 to form a fuel holder. A dividing wall 28 is secured to the intermediate walls 26 and 27 to form compartments for the fuel 29 as shown in Fig. 2. Each of these compartments is provided with a grid 30 spaced from the bottom upon which the fuel rests, and a perforated cover 31 having depending perforated side walls 32 which cover is hinged at 33 to the wall 26. The cover and side walls are arranged to protect the fuel and prevent it from being displaced when the receptacle is being transported. The fuel tray is held in its position on the guides 19 in the fuel chamber 8 by means of a gravity operated latch 34 pivoted at 35 on the wall 1.

A food container 36 is inserted in the receptacle and spaced from the inner wall 3 by an annular ring 37. The bottom of the container is spaced from the bottom 4 by means of strips 38 which permit the heat from the fuel chamber to pass therebetween and along the bottom of the container and upwardly to the ring 37. The container is provided with a cover 39 having a depending inwardly turned interior rim 40 which snugly fits the interior wall of the container 36 and an exterior rim 41, between which rims a gasket 42 is housed and serves to engage the upper end of the container to form a tight joint between the cover and container. It will therefore be seen that the annular ring 37 closes the space between the container and inner wall 3 of the receptacle, so that the products of combustion passing upwardly from the fuel chamber will be retained within the receptacle around the container for an indefinite period. To make this condition more effective I prefer to use as a fuel a composition which is smokeless, flameless and of a slow burning nature.

The cover is also provided with a handle 43 by which it is manipulated. The container may be inserted or removed from the receptacle by means of chains 44 fixed to the sides above the ring 37.

The receptacle may be conveniently transported by means of handles or links 45 secured to the wall 1.

To protect and reinforce the lower end of the receptacle I provide a band 46 which extends below the bottom 2 and is secured to the wall 1.

When the contents of the container 36 have been cooked to the required amount and it is desired that the heat of the contents be maintained for a considerable period with or without the aid of the fuel, I find it advantageous to remove the plate 13 from the cover 10 and place it on the bottom 4, as shown in Fig. 4 so as to completely close the opening 8* in the bottom 4 and prevent the heat from entering therethrough or if the fuel tray is removed to keep the cold air from entering the receptacle around the container.

In the construction of the receptacle, I find it particularly advantageous, especially at the cover 10 to keep the rim 11 spaced from the wall 1 by means of the gasket 12 resting on the rim 5 and the filler piece 15 engaging the wall 3 so that the metal surfaces are not in contact thereby preventing any oxidation of the parts.

It will be understood that various changes may be resorted to in the form, construction and arrangement of the several parts without departing from the spirit and scope of my invention, and hence I do not intend to be limited to the details herein shown and described except as they may be specifically included in the claims.

What I claim is:

1. A storage receptacle comprising outer and inner walls and outer and inner bottoms, an intermediate bottom interposed between said bottoms, an insulating medium interposed between the walls and bottoms, a cover provided with an insulating medium engaging the top and extending downwardly in contact with the inner wall of the receptacle and a fuel chamber located between the inner and intermediate bottoms and communicating directly with the interior of the receptacle through the inner bottom.

2. A storage receptacle comprising outer and inner walls and outer and inner bottoms, an intermediate bottom interposed between said bottoms, an insulating medium interposed between the walls and bottoms, a cover provided with an insulating medium engaging the top and extending downwardly in contact with the inner wall of the receptacle, a fuel chamber located between the inner and intermediate bottoms and communicating directly with the interior of the receptacle through the inner bottom and a fuel tray movable in said chamber above the intermediate bottom.

3. A storage receptacle comprising outer and inner walls and outer and inner bottoms, an intermediate bottom interposed between said bottoms, an insulating medium interposed between the walls and bottoms, a cover provided with an insulating medium engaging the top and extending downwardly in contact with the inner wall of the receptacle, a fuel chamber located between the inner and intermediate bottoms and communicating directly with the interior of the receptacle through the inner bottom and a fuel tray movable in said chamber above the intermediate bottom, said fuel tray having a perforated bottom and a compartment for the fuel.

4. A storage receptacle comprising outer and inner walls and outer and inner bottoms, an intermediate bottom interposed between said bottoms, an insulating medium interposed between the walls and bottoms, a cover provided with an insulating medium in contact with the inner wall of the receptacle, a fuel chamber located between the inner and intermediate bottoms and communicating with the interior of the receptacle through the inner bottom and a fuel tray movable in said chamber above the intermediate bottom, said fuel tray having a perforated bottom, a compartment for the fuel, a grip and a perforated cover.

5. A storage receptacle comprising outer and inner walls and outer and inner bottoms, an intermediate bottom interposed between said bottoms, an insulating medium interposed between the walls and bottoms, a cover provided with an insulating medium engaging the top and extending downwardly in contact with the inner wall of the receptacle, a fuel chamber located between the inner and intermediate bottoms and communicating with the interior of the receptacle through the inner bottom and a fuel tray movable in said chamber above the intermediate bottom, said fuel tray having a perforated bottom, a compartment for the fuel, a grid and a perforated cover having side walls.

6. A storage receptacle comprising outer and inner walls and outer and inner bottoms, an intermediate bottom interposed between said bottoms, an insulating medium interposed between the walls and bottoms, a cover provided with an insulating medium in contact with the inner wall of the receptacle, a fuel chamber located between the inner and intermediate bottoms and communicating with the interior of the receptacle through the inner bottom and a fuel tray movable in said chamber above the intermediate bottom said fuel tray having a perforated bottom, a compartment for the fuel, a grid and a perforated cover having side walls and hinged to the tray.

7. A storage receptacle comprising outer and inner walls and outer and inner bottoms, an intermediate bottom interposed between said bottoms, an insulating medium interposed between the walls and bottoms, a cover provided with an insulating medium in contact with the inner wall of the receptacle, a fuel chamber located between the inner and intermediate bottoms and communicating with the interior of the receptacle through the inner bottom and a fuel tray movable in said chamber above the intermediate bottom, said fuel tray having a perforated bottom, and separate compartments for the fuel, each of said compartments being provided with a grid and a perforated cover having side walls and hinged to the tray.

8. A storage receptacle comprising outer and inner walls and bottoms, an insulating medium interposed between said walls and bottoms and a cover provided with an insulating medium arranged to contact with the top and inner wall of the receptacle to seal the same.

9. A storage receptacle comprising outer and inner walls and bottoms, an insulating medium interposed between said walls and bottoms, a cover provided with an insulating medium in contact with the inner wall of the receptacle, a fuel chamber interposed between the bottoms and communicating with the interior of the receptacle through the inner bottom and a plate removably secured to said cover and adapted to be located on the inner bottom to close the communication between the fuel chamber and the interior of the receptacle.

10. A storage receptacle having inner and outer bottoms, a fuel chamber interposed between said bottoms and communicating with the interior of the receptacle through the inner bottom, a container supported on the inner bottom and spaced from the fuel chamber, and a removable ring interposed between the container and interior wall of the receptacle near the top to arrest and maintain the products of combustion from the fuel chamber around the container.

11. A storage receptacle having inner and outer bottoms, a fuel chamber interposed between said bottoms and communicating with the interior of the receptacle through the inner bottom, a container supported on the inner bottom and spaced from the fuel chamber, and a ring removable with said container and arranged to engage the interior wall of the receptacle near the top to arrest and maintain the products of combustion from the fuel chamber around the container.

In testimony, that I claim the foregoing as my invention, I have signed my name this 18th day of October, 1918.

ALEXANDER C. BATES.